US007246528B2

(12) United States Patent
Tanabe

(10) Patent No.: US 7,246,528 B2
(45) Date of Patent: Jul. 24, 2007

(54) TONER EVALUATION METHOD, TONER CARTRIDGE, AND IMAGE FORMING APPARATUS

(75) Inventor: Satoshi Tanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/089,358

(22) Filed: Mar. 25, 2005

(65) Prior Publication Data

US 2005/0217387 A1 Oct. 6, 2005

(30) Foreign Application Priority Data

Mar. 30, 2004 (JP) ............................. 2004-099190

(51) Int. Cl.
*G01N 3/08* (2006.01)

(52) U.S. Cl. ............................ 73/818; 73/819; 73/821

(58) Field of Classification Search .................. 73/818, 73/819, 821
See application file for complete search history.

(56) References Cited

U.S. PATENT DOCUMENTS 4,074,569 A * 2/1978 Sambrook et al. ............ 73/806
4,238,952 A * 12/1980 Koopmann et al. ........... 73/822
4,913,991 A * 4/1990 Chiba et al. .................. 430/45
5,057,392 A * 10/1991 McCabe et al. ......... 430/109.2
5,565,293 A * 10/1996 Akiyama et al. ........ 430/110.2
5,708,224 A * 1/1998 Palcisko ...................... 43/866
6,383,705 B2 5/2002 Aoki et al.
6,503,679 B2 * 1/2003 Aoki et al. .............. 430/108.8
2003/0118932 A1 * 6/2003 Kondou et al. .......... 430/109.2
2003/0151648 A1 * 8/2003 Suda et al. ................... 347/85

FOREIGN PATENT DOCUMENTS

JP A 08-278657 10/1996
JP A 2001-222138 8/2001
JP A 2003-246920 9/2003

* cited by examiner

*Primary Examiner*—Edward Lefkowitz
*Assistant Examiner*—Punam Patel
(74) *Attorney, Agent, or Firm*—Oliff & Berridge PLC

(57) ABSTRACT

A toner evaluation method that enables accurate evaluation of fixation performance of toner such as low temperature fixability and offset resistance, and a toner cartridge and an image forming apparatus adopting the toner positively evaluated by the evaluation method are provided. Toner is formed into a disc-shaped pellet. After preserved at a predetermined temperature, the pellet is compressed by a predetermined amount at a constant speed. If the maximum load (compression resistance) measured during the compression is a predetermined value or below, the minimum fixing temperature of the toner is relatively low.

13 Claims, 9 Drawing Sheets

TONER EVALUATION METHOD, TONER CARTRIDGE, AND IMAGE FORMING APPARATUS

CROSS-REFERENCE TO RELATED APPLICATIONS

This application claims the benefit of Japanese Patent Application No. 2004-99190 filed Mar. 30, 2004 in the Japan Patent Office, the disclosure of which is incorporated herein by reference.

BACKGROUND

This invention relates to a toner evaluation method that evaluates fixation performance of toner used in electrophotography. This invention also relates to a toner cartridge and an image forming apparatus that use the toner positively evaluated by the above evaluation method.

Heretofore, a so-called pressing/heating fixation system has been adopted to fix toner transferred onto a recording material, like recording paper, in an image forming apparatus for electrophotography. In the pressing/heating fixation system, for example, the recording paper after the toner is transferred is held between a heating roller and a pressing roller both provided in a fixing unit. The toner is then pressed onto the surface of the paper and heated to be melted so as to be settled and solidified onto the recording paper.

However, the fixing unit adopting such a pressing/heating fixation system requires a great amount of power. There are cases in which 70% of the total power consumption is spent for fixation in recent image forming apparatus. Therefore, development of various toners has been undertaken, which are excellent in low temperature fixability and offset resistance.

For example, Unexamined Japanese Patent Publication No. 8-278657 discloses a method for obtaining a toner by using two types of waxes having specific properties. Also, Unexamined Japanese Patent Publication No. 2001-222138 discloses a method for producing a toner by mixing an amorphous polyester and a crystalline polyester at a predetermined ratio.

SUMMARY

However, even the toners manufactured by the same manufacturing method often make differences in fixation performance. It has not been fully elucidated what manufacturing conditions create such differences. Accordingly, even the toners manufactured in the above-disclosed manners may not provide sufficient low temperature fixability and offset resistance. Therefore, it is necessary to examine (evaluate) the manufactured toners to confirm whether a desired fixation performance is obtained according to expectation.

One object of the present invention is to provide a toner evaluation method by which fixation performance, such as low temperature fixability and offset resistance, of toner can be accurately evaluated. Another object of the present invention is to provide a toner cartridge and an image forming apparatus that use the toner positively evaluated by the evaluation method.

In order to attain the above and other objects, the present invention, in one aspect, provides a toner evaluation method that evaluates fixation performance of toner. The method comprises: a preserving step in which a toner is preserved at a predetermined temperature; a compression step in which the toner preserved at the predetermined temperature is compressed by a predetermined amount at a constant speed, and a maximum load on the toner is measured during compression of the toner; and an evaluation step in which fixation performance of the toner is evaluated by determining whether the maximum load is not more than a predetermined value.

The inventor of the present application discovered that, if a toner (a toner formed into a pellet) is preserved at a predetermined temperature and then compressed at a constant speed, there is an extremely close correspondence between the low temperature fixability and the maximum load obtained during the compression of the toner. It was also found that the smaller the maximum load is, the lower the minimum fixing temperature is. Accordingly, a toner which is positively evaluated in the above evaluation step has a minimum fixing temperature lower than the minimum fixing temperature corresponding to the predetermined value (of the maximum load).

Use of the toner positively evaluated by the above evaluation method in an image forming apparatus enables lowering of the temperature of a heating roller and hence, enables reduction of the power consumption of the image forming apparatus.

For the purpose of improving accuracy of the evaluation in the above evealuation step, the present invention may be constituted as follows.

That is, the toner evaluation method of the present invention may further comprise a sampling step in which a toner is sampled, and a pellet forming step in which the sampled toner is formed into a pellet. In this case, the formed pellet may be preserved at a predetermined temperature in the aforementioned preserving step. The pellet preserved at the predetermined temperature may be compressed by a predetermined amount at a constant speed, and a maximum load on the pellet may be measured during compression of the pellet in the aforementioned compression step.

Parameters not particularly defined in the above, such as the predetermined value of the maximum load, etc., can be arbitrarily set according to the required low temperature fixability of the toner.

The present invention, in another aspect, provides a toner cartridge in which a toner is filled which has been positively evaluated by tho aforementioned toner evaluation method. In an image forming apparatus comprising such a toner cartridge, the toner is excellent in low temperature fixability. Therefore, without raising the temperature of the heating roller so high, fixation of an image can be performed.

The present invention, in further another aspect, provides an image forming apparatus comprising the aforementioned toner cartridge, and an image forming unit that forms an image by electrophotography using the toner filled in the toner cartridge. Accordingly, in such an image forming apparatus, without raising the temperature of the heating roller so high, fixation of an image can be favorably performed. Also, the power consumption of the image forming apparatus can be reduced in a favorable manner.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Figure 1:
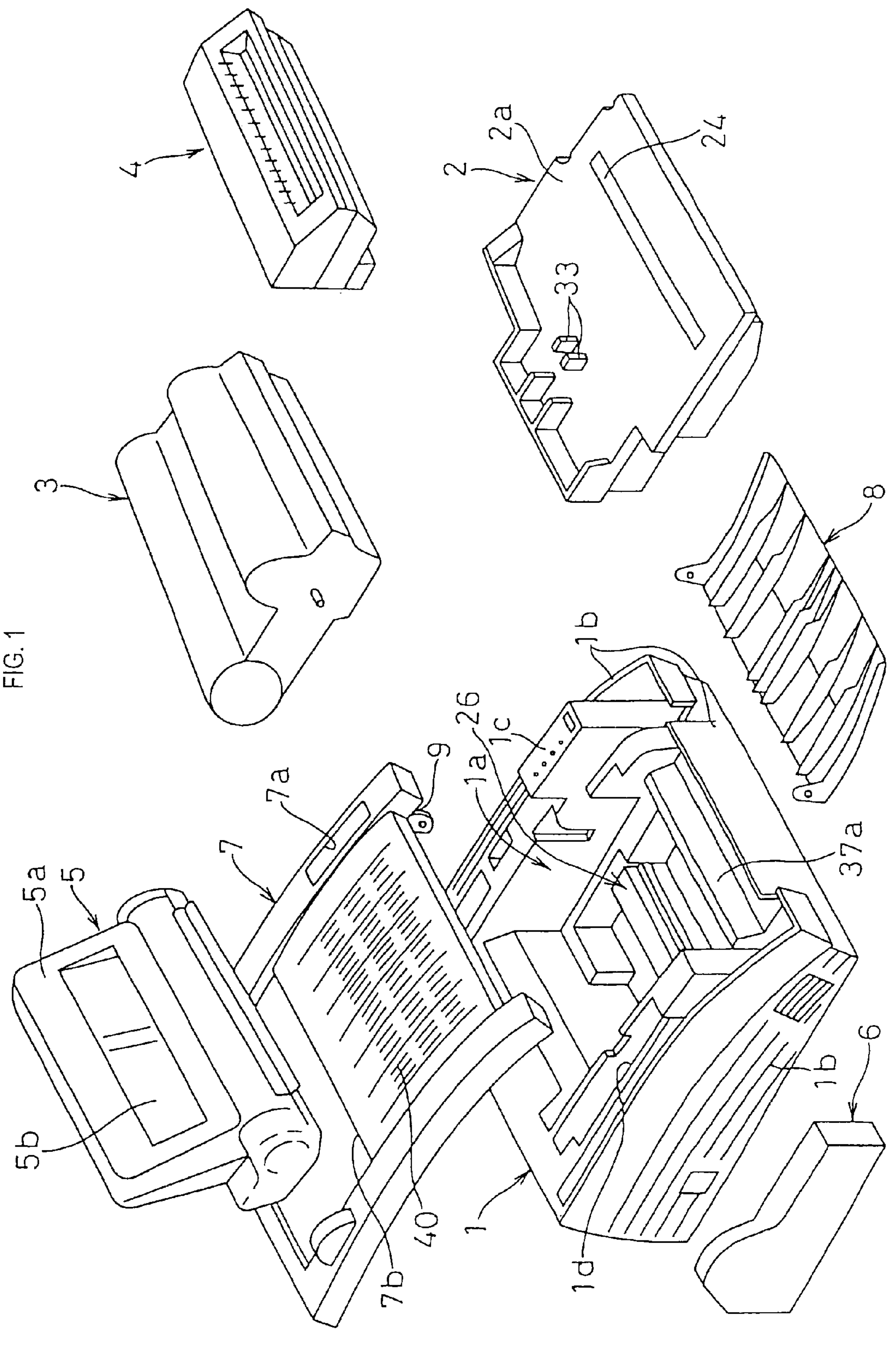
FIG. 1 shows perspective views of major components of a laser printer according to an embodiment of the present invention.

Referring to FIG. 1, a laser printer of the present embodiment comprises a body case 1 made of synthetic resin. The body case 1 is composed of a box-like main frame 1*a* having an open top surface, and a main cover body 1*b* which covers four peripheral side faces (front, back, right and left faces) of the main frame 1*a*. The main frame 1*a* and the main cover body 1*b* are integrally molded, for example, by projection molding.

A scanner unit 2, a process cartridge 3, a fixing unit 4, and a feeding unit 5 are fitted into the main frame 1*a* from the above.

A driving unit 6, including a driving motor and a gear train, is inserted into a storage groove 1*d* from under the body case 1, and fixed thereto. The storage groove 1*d* is provided between a left inner face of the main cover body 1*b* and an adjacent left outer face of the main frame 1*a*. There is also provided a top cover 7 which is made of synthetic resin and covers the top of the body case 1. On the top cover 7 are bored a hole 7*a* through which an operation panel 1*c* protrudes upward on the right side of the main frame 1*a*, and a hole 7*b* through which a base of the feeding unit 5 is passed. A base of a discharge tray 8 is swingably attached to brackets 9 (only one of them is shown in FIG. 1) provided in a protruding manner on both left and right sides of the front end of the top cover 7. The discharge tray 8, when not used, can be folded over the top face of the top cover 7.

Figure 2:
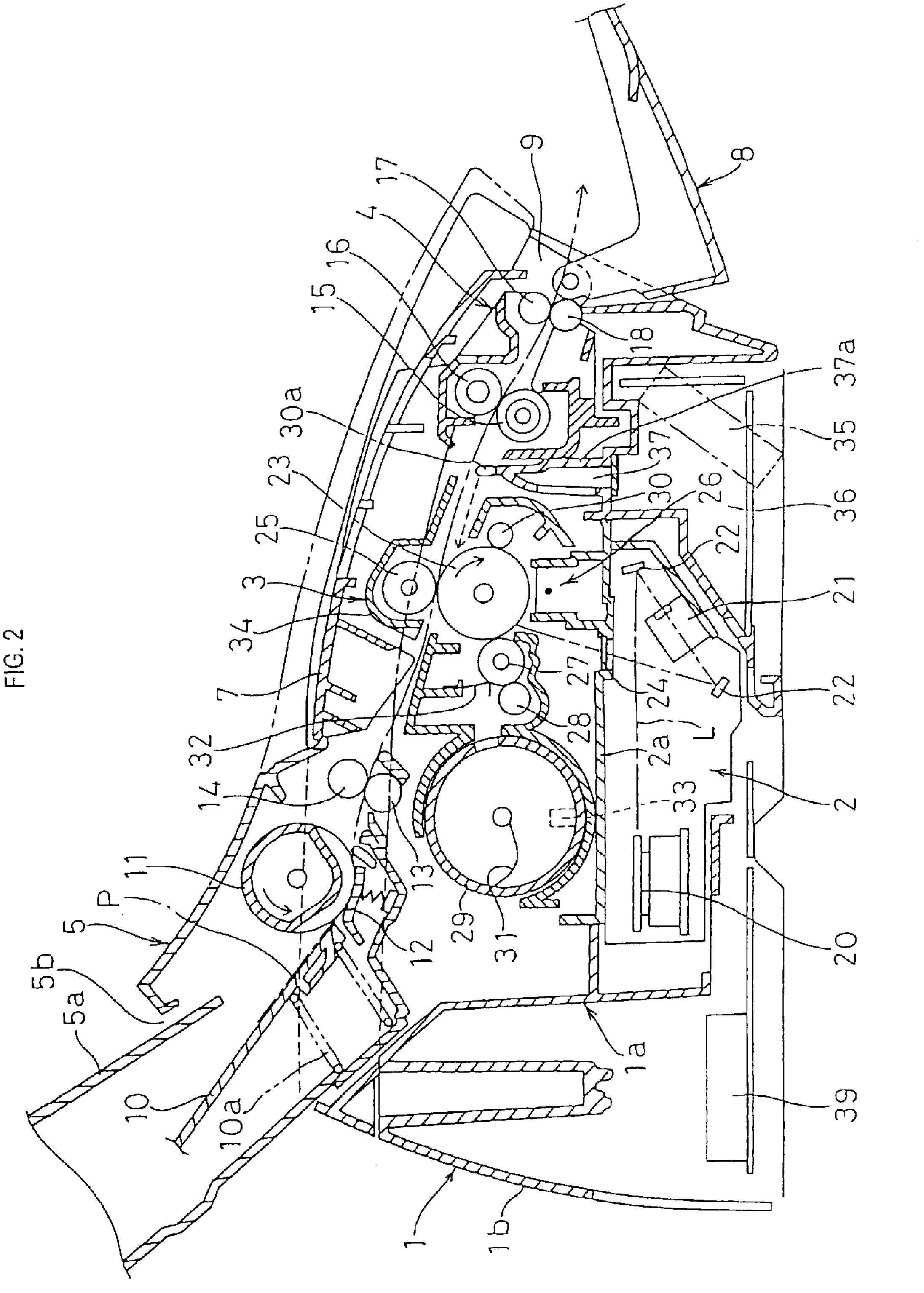
FIG. 2 is a schematic side view in cross section, of the laser printer.

Inside a feeder case 5*a* of the feeding unit 5, a recording paper P is set in a stacked state. As shown in FIG. 2, a front end, facing a feeding roller 11 which receives power from the driving unit 6 and rotates, of the recording paper P is pressed by a support plate 10 that is urged by a spring 10*a* provided inside the feeder case 5*a*. The recording paper P is separated from other recording papers by the feeding roller 11 and a separation pad. 12, and is delivered toward a pair of resist rollers 13 and 14.

In the process cartridge 3, an image is formed with a toner T (FIG. 3) on a surface of the recording paper P delivered from the resist rollers 13 and 14. In the fixing unit 4, the recording paper P on which the image is formed with the toner T is held between a heating roller 15 and a pressing roller 16 and heated so that the toner image is fixed onto the recording paper P. A discharger including a discharger roller 17 and a pinch roller 18, both located downstream inside a case of the fixing unit 4, discharges the recording paper P having a fixed toner image onto a discharge tray 8. A section from the feeding roller 11 to the discharger is referred to as a recording material conveying route. The feeding unit 5 is provided with a manual feeding opening 5*b* which opens obliquely upward so that a recording paper, other than the recording paper P set inside the feeder case 5*a*, can be inserted to the recording material conveying route and printed.

In a lower section of the process cartridge 3 disposed substantially in the middle of the main frame 1*a*, an upper support plate 2*a* of the scanner unit 2 is fixed to a stay by a screw. The stay is integrally formed on the upper face of a bottom plate of the main frame 1*a*. In the scanner unit 2, a laser emitter (not shown), a polygon mirror 20, a lens 21, and reflecting mirrors 22 are disposed below the upper support plate 2*a*. On the upper support plate 2*a*, a glass board 24 is provided which covers a horizontally long scanner hole which is bored to extend along an axis line of a photosensitive drum 23. A laser beam L emitted from the laser emitter is irradiated on the peripheral face of the photosensitive drum 23 via the polygon mirror 20, the reflecting mirrors 22, the lens 21, and the glass board 24.

Figure 3:
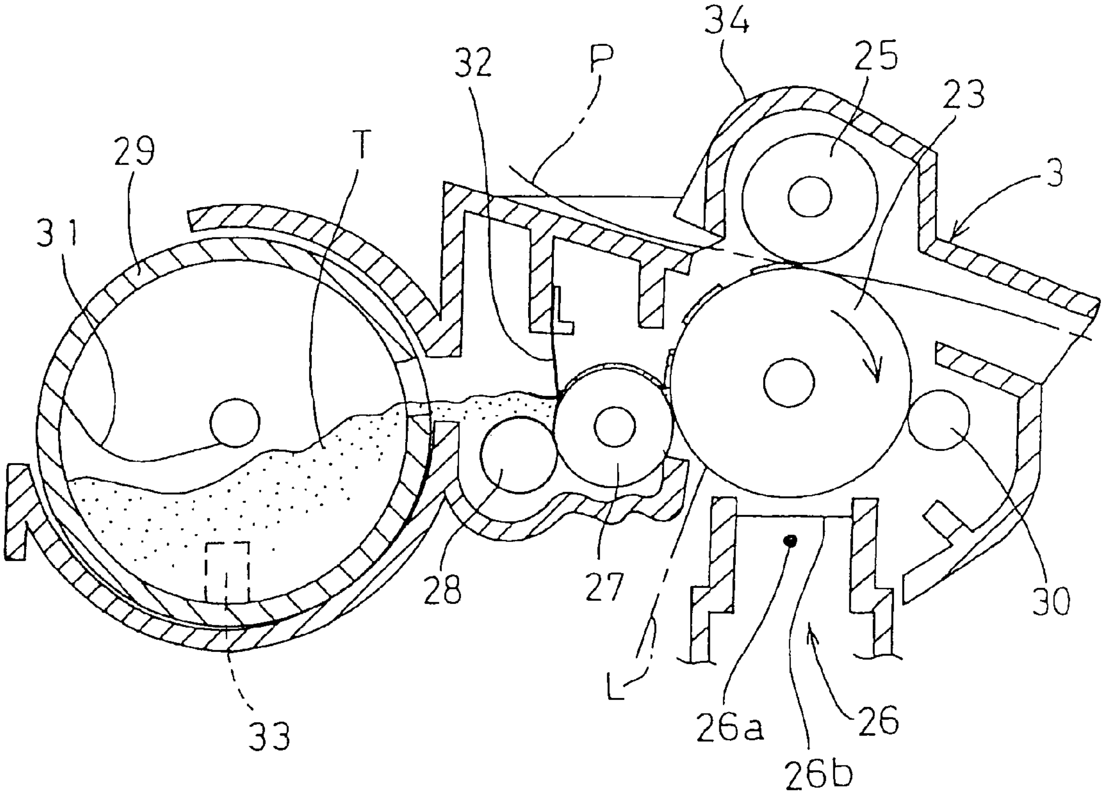
FIG. 3 is an enlarged view showing a structure of a process cartridge of the laser printer.

As shown in FIGS. 2 and 3, the process cartridge 3 comprises a developing device, a toner box 29, and a cleaning roller 30. The developing device includes the photosensitive drum 23, a transfer roller 25 arranged to abut un the top face of the photosensitive drum 23, a developing roller 27 disposed upstream of the photosensitive drum 23 in a feeding direction, and a supply roller 28 disposed upstream of the developing roller 27. The toner box 29 is disposed upstream of the supply roller 28 and can be attached to and detached from the process cartridge 3. The cleaning roller 30 is disposed downstream of the photosensitive drum 23. The above mentioned components of the process cartridge 3 are fitted into a case 34 made of synthetic resin. The process cartridge 3 is detachably attached to the main frame 1*a*. The photosensitive drum 23, the developing roller 27, and the supply roller 28 are all rotated in a clockwise direction in FIG. 2. In this case, the developing roller 27 and the supply roller 28 may be adapted to be rotated in a counterclockwise direction instead.

A neutralizing lamp 30*a* that neutralizes the photosensitive drum 23 is provided between the process cartridge 3 and the fixing unit 4. A charger 26 is provided below the photosensitive drum 23. The charger 26 is a known positive scorotron charger including a discharge wire 26*a*, made of tungsten, and a grid electrode 26*b*. The charger 26 is integrally formed on the top of the upper support plate 2*a* of the scanner unit 2.

On the peripheral face of the photosensitive drum 23, a photosensitive layer charged by the charger 26 is scanned by the laser beam L which is modulated by the scanner unit 2 according to image information. As a result, an electrostatic latent image is formed on the peripheral face of the photosensitive drum 23. As shown in FIG. 3, the toner T stored inside the toner box 29 is agitated by an agitator 31 and discharged to be carried onto a peripheral face of the developing roller 27 via the supply roller 28. The thickness of a layer of the toner T on the peripheral face of the developing roller 27 is controlled by a layer thickness control blade 32. The toner T from the developing roller 27 is adhered to the electrostatic latent image on the photosensitive drum 23 to form an (developed) image.

The image formed on the photosensitive drum 23 with the toner T (i.e., toner image) is transferred onto the recording paper P which is passed between the transfer roller 25 and the photosensitive drum 23. To the transfer roller 25, a transfer bias is applied which has an electric potential opposite to the electric potential of the photosensitive drum 23. The toner T left on the photosensitive drum 23 is temporarily collected by the cleaning roller 80. The collected toner T is then returned to the photosensitive drum 23 and collected into the process cartridge 3 by the developing roller 27 at a predetermined timing.

A toner sensor 33 protruding upward is provided on the upper support plate 2*a* of the scanner unit 2 (see FIGS. 1 and 2). The toner sensor 33 comprises a pair of light emitter and light receiver, and faces a bottom concave of the toner box 29 so as to detect presence of the toner T inside the toner box 29.

Returning to FIG. 2, a storage 36, storing a cooling fan 35, and a ventilation duct 37 are provided and connected to each other below a connecting part between a front region of the main frame 1*a* and a front region of the main cover body 1*b*. The ventilation duct 37 extends in a direction orthogonal to a passing direction of the recording paper P. A top plate part 37*a*, which is formed in an inverted V-shape in a cross section, of the ventilation duct 37 is disposed between the process cartridge 3 and the fixing unit 4 so that the heat generated from the heating roller 15 of the fixing unit 4 is not directly transmitted to the process cartridge 3.

Cooling wind from the cooling fan 35 is carried through the ventilation duct 37 along a lower section of the main frame 1*a* so as to cool a power source 39 and the driving motor of the driving unit 6. Also, the cooling wind blows out from a plurality of slit holes opening to the process cartridge 3 side on the top plate part 37*a*. The cooling wind is passed between the process cartridge 3 and the fixing unit 4, and drifted upward so as to be discharged to the outside from a plurality of discharge holes 40 (FIG. 1) bored on the top cover 7.

Now, the developing mechanism of the toner image is explained. The toner T stored in the toner box 29 contains a bonding resin including a crystalline polyester and an amorphous polyester as base materials. The toner T is a positive charging electrophotographic toner manufactured in the same manner as disclosed in the Unexamined Japanese Patent Publication Nos. 2001-222138 and 2003-246920.

The supply roller 28 is a so-called foaming roller made of urethane foam having open cells. The developing roller 27 is formed of silicone rubber as the base material and has a column shape. The developing roller 27 also contains carbon particles.

As the supply roller 28 and the developing roller 27 are rotated and brought in frictional contact, the toner T is rubbed therebetween and positively charged. The positively charged toner T is adhered to the smooth surface of the developing roller 27 by a mirror image force. Accordingly, the positively charged toner T is conveyed to the surface of the photosensitive drum 23 by the supply roller 28 and the developing roller 27. The base material of the developing roller 27 may not necessarily be a silicone rubber but a urethane rubber.

The photosensitive drum 23 is formed of polycarbonate, etc. For example, the photosensitive drum 23 is a grounded aluminum cylindrical sleeve having a photoconductive layer around the peripheral face. Photoconductive resin is dispersed in the photoconductive layer made of polycarbonate. Accordingly, at a facing part between the developing roller 27 and the photosensitive drum 23, the electrostatic latent image having positive polarity (positively charged) formed on the photosensitive drum 23 can be developed using the positively charged toner T on a reverse development system. The developed toner image is then transferred to the recording paper P at a facing position between the photosensitive drum 23 and the transfer roller 25 so that a desired image is formed on the recording paper P.

The recording paper P having the image formed thereon is held between the heating roller 15 and the pressing roller 16 of the fixing unit 4. The toner T is pressed onto the sheet surface of the recording paper P and heated. Accordingly, the toner T is melted and settled onto the recording paper P.

In the present embodiment, only the toner T having excellent fixability is selected and filled in the toner box 29 according to the following evaluation method. Therefore, the temperature of the heating roller 15 can be lowered and the power consumption of the laser printer can be reduced.

Figure 4:
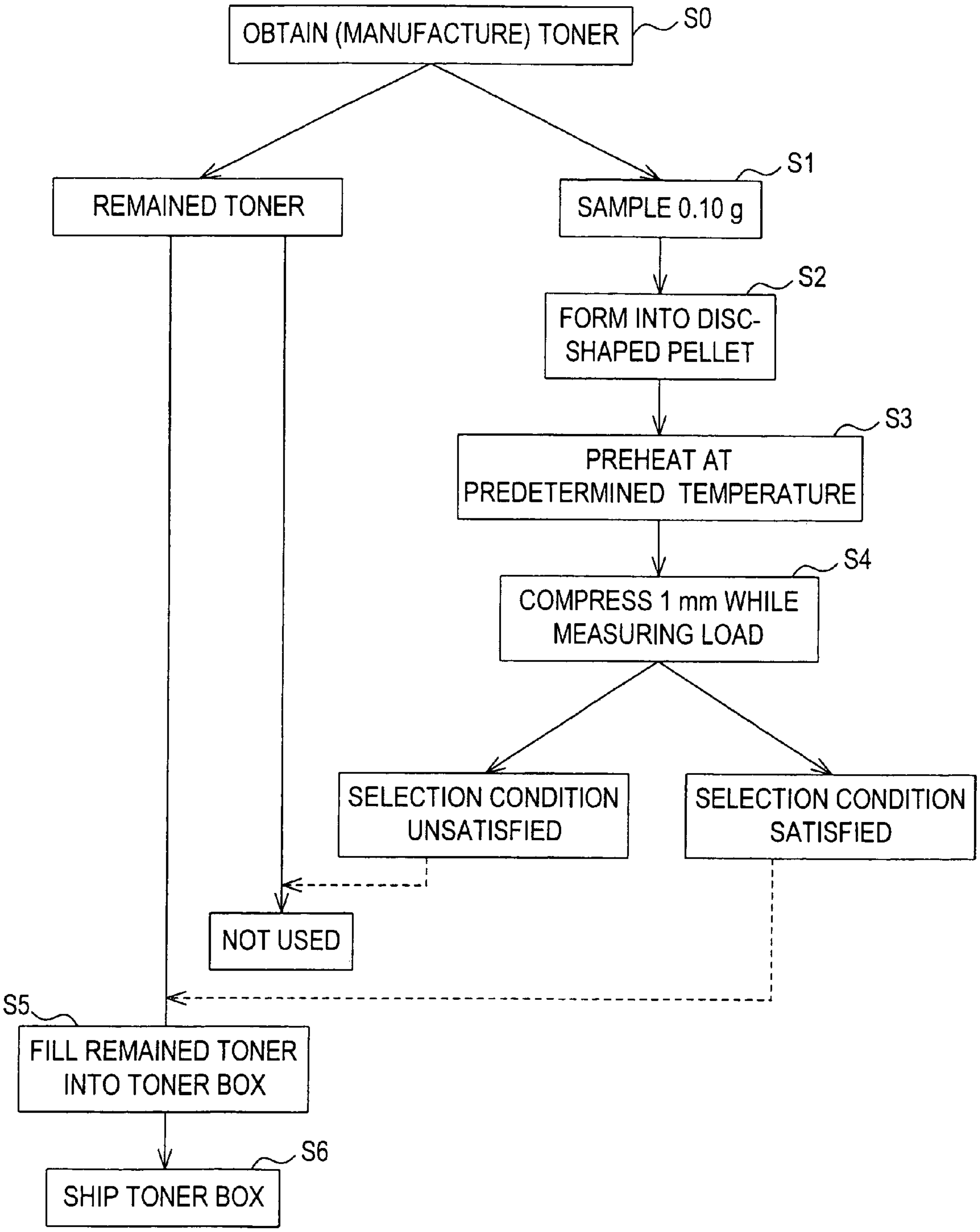
FIG. 4 is an explanatory view showing a manufacturing method of a toner box according to the embodiment.
Figure 5:
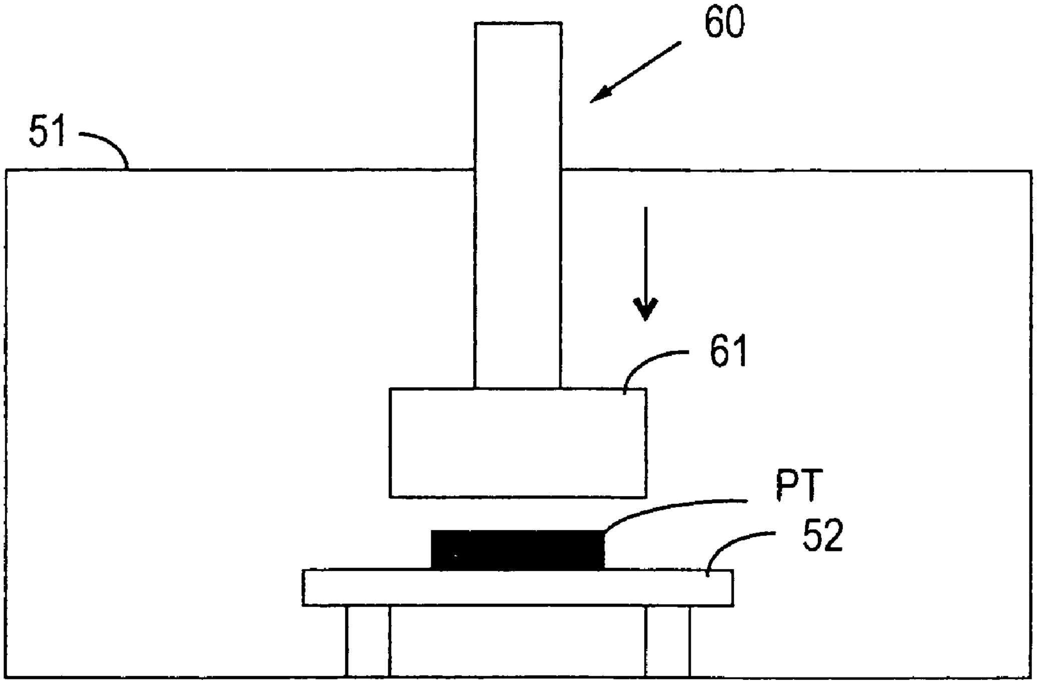
FIG. 5 is an explanatory view showing a device which measures compression load in the manufacturing method.

FIG. 4 is an explanatory diagram showing the manufacturing method of the toner box 29 of the present embodiment. The method focuses on the evaluation method of the toner T. As can be seen from FIG. 4, firstly, the toner T is obtained by purchasing or manufacturing (S0). Then, about 0.10 g of the toner T is sampled (S1). The sampled toner T is formed into a disc-shaped pellet PT (see FIG. 5) having a diameter of about 7 mm and a thickness of about 2 mm (S2). The pellet PT is placed on a specimen support 52 provided inside a constant-temperature chamber 51 as shown in FIG. 5. The pellet PT is preheated and preserved at a predetermined temperature (e.g., about 80° C.) (S3). The "predetermined temperature" herein can be set in various manners. For example, the temperature on the specimen support 52 where the pellet PT is placed may be kept at a preset temperature (STa) to maintain the temperature of the pellet PT at the "predetermined temperature". In this case, when it is confirmed by measurement that the preset temperature (STa) is a specific value (e.g., 80° C.), the temperature of the pellet PT may be determined as the "predetermined temperature". Alternatively, the ambient temperature inside the constant-temperature chamber 51 may be kept at a preset temperature (STb) to maintain the temperature of the pellet PT at the "predetermined temperature". In this case, when it is confirmed by measurement that the preset temperature (STb) is a specific value (e.g., 80° C.), the temperature of the pellet PT may be determined as the "predetermined temperature". When the preheating is completed, a plummet 61 of a compression testing machine 60 (e.g., a texture analyzer manufactured by Stable Micro Systems) is placed on the pellet PT in such a manner that the pressure is applied to the overall pellet PT. The pellet PT is compressed by 1 mm at a speed of about 5 mm/sec and the load is measured (S4). If the measured maximum load is a predetermined value (e.g., 8,000 g) or below, it is determined that the toner T satisfies a selection condition. The remaining toner T is then filled into the toner box 29 (S5), and shipped (S6). On the other hand, if the maximum load is over the predetermined value, it is determined that the toner T does not satisfy the selection condition and the remaining toner T is not used.

It has been found from the study of the inventor that, when the above "predetermined temperature" is set to 80° C. and the above predetermined value. is set to 8,000 g, the minimum fixing temperature of the toner T which satisfies the selection condition is low, i.e., 130° C. Moreover, it has been also found that, when the "predetermined temperature" is set to 70° C. and the predetermined value is set to 17,000 g, the minimum fixing temperature of the toner T which satisfies the selection condition is lower, i.e., 120° C. Since the laser printer of the present embodiment uses the toner box 29 filled with the toner T which satisfies the selection condition, the temperature of the heating roller 15 can be lowered and the power consumption of the laser printer can be reduced.

A second selection condition may be added to the above first selection condition. That is, viscoelasticity of the toner T may be measured while the temperature of the toner T is being changed. If the loss tangent tan δ (=G"/G'), which is a ratio between a storage modulus G' and a loss modulus G" measured in the viscoelasticity measurement, does not have a maximum value in a predetermined temperature range (i.e., a temperature range from 100° C. to below 125° C. in the present embodiment), the toner T is determined to satisfy the second selection condition.

The fixing temperature range of the toner T which satisfies the second condition is relatively wide (i.e., 60° C. and above in the present embodiment). The toner is considered to have favorable offset resistance.

Particularly, in case that the above loss tangent tan δ has a maximum value in a range below 100° C., the resin constituting the toner is very hard. Tho fixing temperature range of the toner is 60° C. and above. It was found that favorable offset resistance is obtained in this case. However, such toner does not often have sufficient low temperature fixability. On the other hand, in case that the loss tangent tan δ has a maximum value in a range equal to or above 125° C., the fixing temperature range of the toner is wide, i.e., 60° C. and above. The toner was found to have favorable offset resistance.

Accordingly, if such a selection condition is added as the second selection condition of the toner T, a toner which is not only superior in low temperature fixability but also excellent in offset resistance can be suitably selected. Even in a small fixing unit 4 having small heat capacity, appearance of low temperature offset and high temperature offset can be inhibited without using release agent such as silicone oil.

Or a third selection condition may be added to the above first selection condition. Weight-average molecular weight Mw and number-average molecular weight Mn may be measured by gel-permeation chromatography. If a ratio (Mw/Mn) between the measured weight-average molecular weight Mw and number-average molecular weight Mn is equal to a predetermined value or more (i.e., 30 or more in the present embodiment), the toner T is determined to satisfy the third selection condition.

The fixing temperature range of the toner T which satisfies the third selection condition is relatively wide (i.e., 60° C. and above in the present embodiment), regardless of the value of the above loss tangent tan δ. The toner is considered to have favorable offset resistance.

Accordingly, if such a selection condition is added as the third selection condition, a toner which is not only superior in low temperature fixability but also excollent in offset resistance can be suitably selected. Even in a small fixing unit 4 having small heat capacity, appearance of low temperature offset and high temperature offset can be inhibited without using any release agent.

The above second and third selection conditions are not essential conditions but sufficient conditions. There may be toners T which satisfy neither of the second and third conditions but have the fixing temperature range of 60° C. and above.

EXPERIMENTS

In order to verify the effectiveness of the aforementioned evaluation method, the following experiments are conducted. That is, toners having various resin compositions as shown in FIG. 1 are manufactured to be tested. In the experiments, not only the toners containing an amorphous polyester and a crystalline polyester as the main components are tested, but also the toners containing only an amorphous polyester as the main component (samples 1 to 3), and a toner containing an amorphous styrene acryl resin as the main component (sample 0) are tested. Also, for the testing using the compression testing machine 60, the temperature of the toner is set either to 70° C., 80° C. or 90° C. Table 1 shows the resin compositions of the respective samples and the results of the test performed thereto. Table 1 also shows the observed values for the minimum fixing temperature and fixing temperature range of the toners composing the samples.

TABLE 1

| toner | resin composition: amorphous polyester (%) | resin composition: crystalline polyester (%) | fixability temperature (° C.): min. fixing temp. | fixability temperature (° C.): fixing temp. range | results of compression load measurement, compression resistance (g): 70 ° C. | 80 ° C. | 90 ° C. | viscoelasticity temperature at which tan δ is maximized (° C.) | molecular weight measurement Mw/Mn |
|---|---|---|---|---|---|---|---|---|---|
| sample 0 | amorphous styrene acryl resin | | 160 | 70 and above | 21122.2 | 13382.6 | 7535.7 | 90 | 33.1 |
| sample 1 | 100 | 0 | 150 | 70 and above | 21838.4 | 12347.1 | 4324.8 | 180 | 43.6 |
| sample 2 | 100 | 0 | 140 | 70 and above | 20945.8 | 11752.7 | 3801.9 | 190 | 65.9 |
| sample 3 | 100 | 0 | 130 | 30 | 20462.8 | 7667.7 | 4121.5 | 120 | 27.2 |
| sample 4 | 80 | 20 | 140 | 70 and above | 19129.9 | 8932.0 | 4499.7 | 170 | 39.2 |
| sample 5 | 80 | 20 | 120 | 10 | 15269.4 | 6841.1 | | 110 | 18.1 |
| sample 6 | 80 | 20 | 120 | 60 | 16296.2 | 7772.9 | 3316.5 | 130 | 32.2 |
| sample 7 | 80 | 20 | 140 | 60 | 17003.6 | 10185.4 | 4177.9 | 130 | 27.8 |
| sample 8 | 80 | 20 | 120 | 60 | 15599.3 | 7551.6 | 2980.2 | 150 | 23.3 |
| sample 9 | 80 | 20 | 110 | 60 | 16514.2 | 7860.5 | 2983.6 | 140 | 19.4 |
| sample 10 | 80 | 20 | 110 | 60 | 15897.6 | 6957.3 | | 125 | 27.6 |
| sample 11 | 80 | 20 | 120 | 70 | 15902.6 | 6935.2 | 2230.4 | 130 | 21.2 |
| sample 12 | 95 | 5 | 130 | 60 | 18164.3 | 6448.9 | 2737.0 | 130 | 20.9 |
| sample 13 | 80 | 20 | 110 | 80 | 16595.2 | 7447.4 | 2559.6 | 110 | 31.4 |
| sample 14 | 80 | 20 | 120 | 70 | 15156.5 | 6742.8 | 2547.0 | not measured | 20.5 |
| sample 15 | 80 | 20 | 110 | 80 | 15307.6 | 7148.8 | 2738.2 | not measured | 20.4 |

The measurement conditions for the data are as below.

With respect to fixability, a commercially available laser printer (HL-1040, Brother Kogyo Kabushiki Kaisha) is altered so that a fixing unit can be removed. Then, a toner box filled with a sample toner is fitted to the printer. An unfixed printing image is printed and the flxability is observed using a fixing testing machine.

The specification of the fixing testing machine is as follows. A heating roller of the fixing testing machine is an aluminum tube coated with resin including fluorine. The heating roller is capable of being heated by a halogen lamp from the inside. A thermocouple is arranged on the surface of the heating roller to control the energization to the halogen lamp, so that a desired surface temperature can be obtained. A pressing roller is an aluminum tube around which silicone rubber having a thickness of 4 mm is rounded. The suppress strength onto the heating roller is adjusted in such a manner that the nip width between the pressing roller and the heating roller is 4 mm. The feeding speed is set to 80 mm/sec.

Fixability was verified by observing whether an offset appears and whether there is sufficient fixing strength. The fixing strength was determined as follows. A plummet of 300 g was set in a rubbing tester (RT-200, Daiei Kagaku Seiki Mfg. Co., Ltd.) for dyed fabric. Cotton polynosic fabric was set at a frictional part. An image printed in all black was fixed and rubbed to and fro five times using the rubbing tester. If the change in density before and after the rubbing was within 10% in the measurement by a reflection densitometer (RD-914, Gretag-Macbeth Company), it was determined that the fixing strength is sufficient. In this manner, the minimumn fixing temperature and the fixing temperature range were measured per each sample.

With respect to compression load, precisely weighed toner of 0.10 g was formed into a disc-shaped pellet having a diameter of 7.0 mm and a thickness of 2.0 mm to 2.1 mm by a pellet producer (SPECTRUM TECH) for infrared spectroscopy. A part where the pellet is brought into contact with the aforemetioned compression testing machine 60 (texture analyzer), was a stainless plate having 1 cm in width and 2 cm in length. The pellet was placed within the plate so that the force is equally applied to a cross section of the pellet. Before the measurement, the pellet was preheated for five minutes or more at the aforementioned "predetermined temperature".

Viscoelasticity of the toners was measured in a range between 70° C. and 190° C. per every 5° C. using a rheometer DAR-100 (Reologica Instruments Inc.) under the following conditions.

Plate: P20ETC

Frequency: 1 Hz

Strain: 0.003

The molecular weight was measured using an ultraviolet detector 870-UV (JASCO Corporation) and a SIC 480 Data Station (System Instruments, Co., Ltd.) as a calculation software, under the following conditions.

Sample density: 0.01 g/10 ml

Sample filtering: use a filter made of PTFE having a bore diameter of 0.5 μm

Solvent: tetrahydrofuran (Kanto Kagaku, for high performance liquid chromatography)

Flow velocity: 1 ml/min. (sent by a pump 880-PU, JASCO Corporation)

Column: connect two columns of KF-805L and a column of KF-802 (both manufactured by Showa Denko K.K.)

Figure 6:
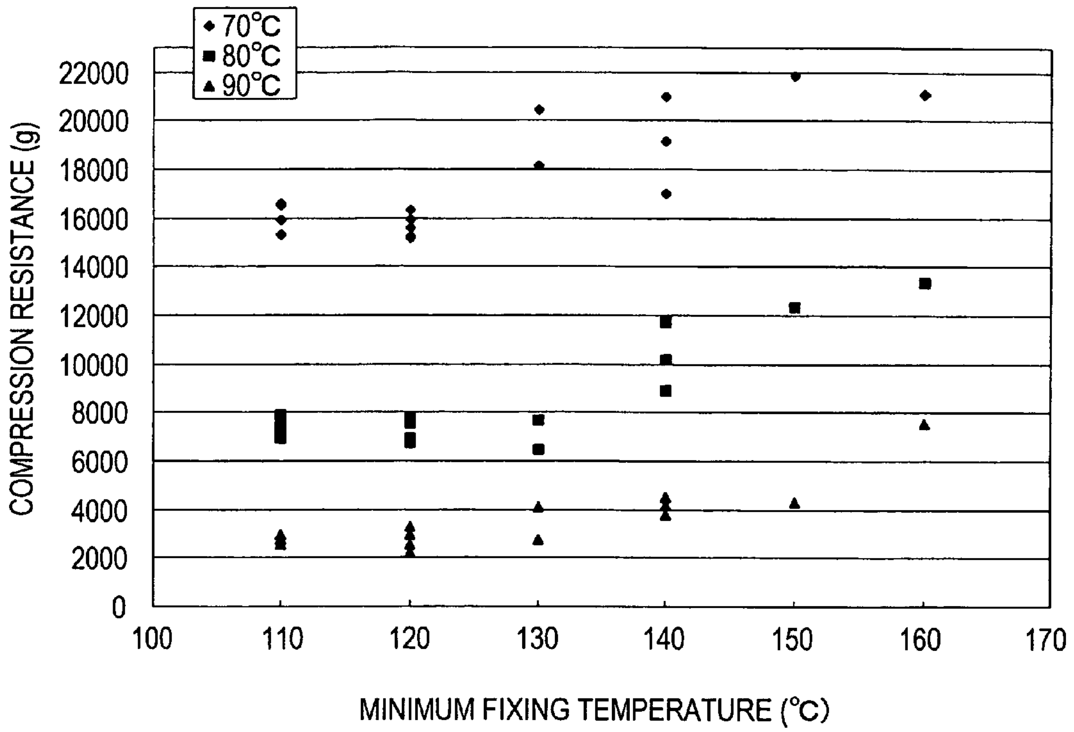
FIG. 6 is an explanatory view showing a correspondence between compression resistances and minimum fixing temperatures of toners.

FIG. 6 is an explanatory view showing a correspondence between the maximum loads (hereafter, the maximum load is also referred to as compression resistance) measured at the respective "predetermined temperatures" and the minimum fixing temperatures of the toners. As shown in FIG. 6, by determining whether the compression resistance measured at the "predetermined temperature" of 80° C. is equal to or lower than 8,000 g, the toner can be classified into a toner having the minimum fixing temperature of 130° C. or less, or a toner having the minimum fixing temperature of 140° C. or above. Accordingly, the toner having the compression resistance of 8,000 g or less, when measured at the "Predetermined temperature" of 80° C. (e.g., samples 3, 5, 6, 8, 9, 10, 11, 12, 13, 14 and 15 shown in Table 1), can be used in a small laser printer in which it is difficult to heat up the heating roller to 140° C. or more.

Similarly, by determining whether the compression resistance measured at the "predetermined temperature" of 70° C. is equal to or lower than 17,000 g, the toner can be classified into a tone having the minimum fixing temperature of 120° C. or less, or a toner having the minimum fixing temperature of 130° C. or above. Accordingly, the toner having the compression resistance of 17,000 g or less, when measured at the "predetermined temperature" of 70° C. (e.g., samples 5, 6, 8, 9, 10, 11, 13, 14 and 15), can be used in a smaller laser printer in which it is difficult to heat up the heating roller to 130° C. or more.

Figure 7:
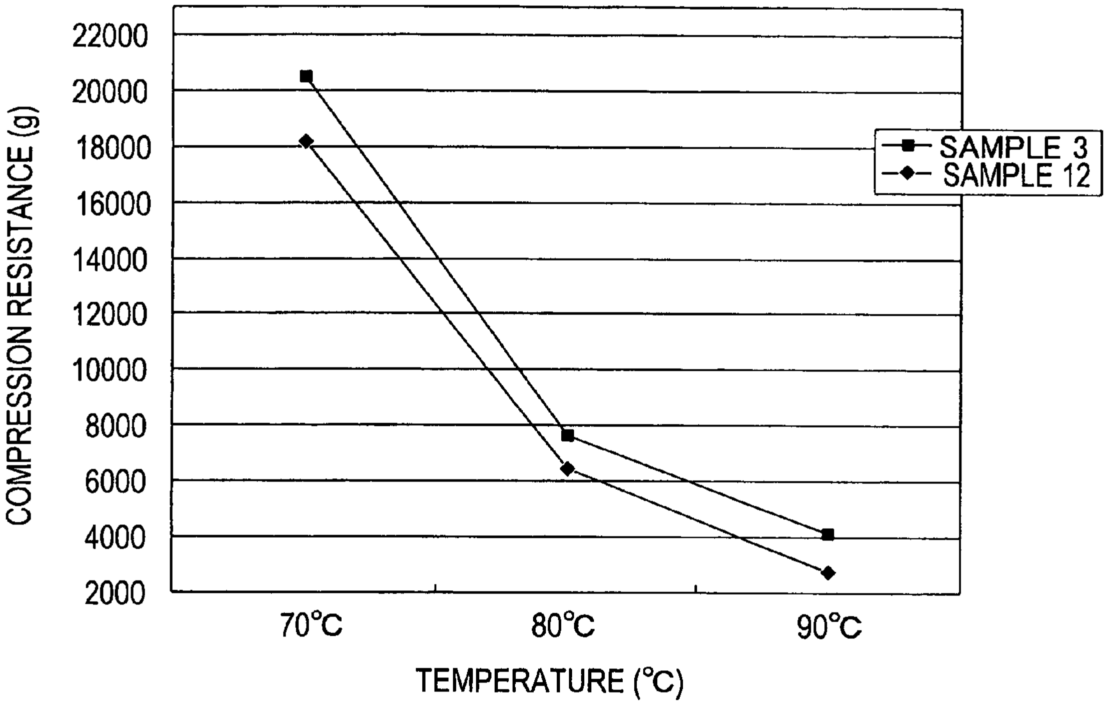
FIG. 7 is an explanatory view showing changes in the compression resistance according to the temperature of toner.

On the other hand, there was no clear correspondence as above between the compression resistances measured at the "predetermined temperature" of 90° C. and the minimum fixing temperatures. FIG. 7 shows changes in the compression resistance by the "predetermined temperature" for two samples (samples 3 and 12) having the minimum fixing temperature of 130° C. Although the changes in the compression resistance for other samples are not shown in FIG. 7, it was found that the compression resistances of the other samples also get smaller as the "predetermined temperature" is raised.

Figure 8:
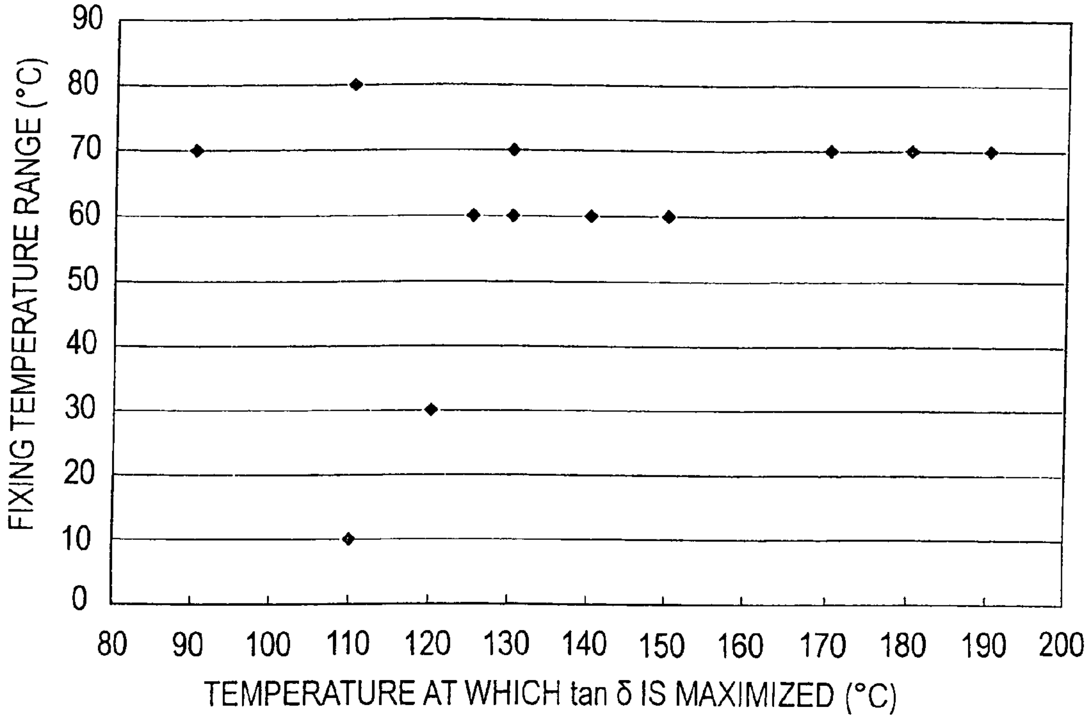
FIG. 8 is an explanatory view showing a correspondence between temperatures at which tan 5 is maximized and fixing temperature ranges.
Figure 9:
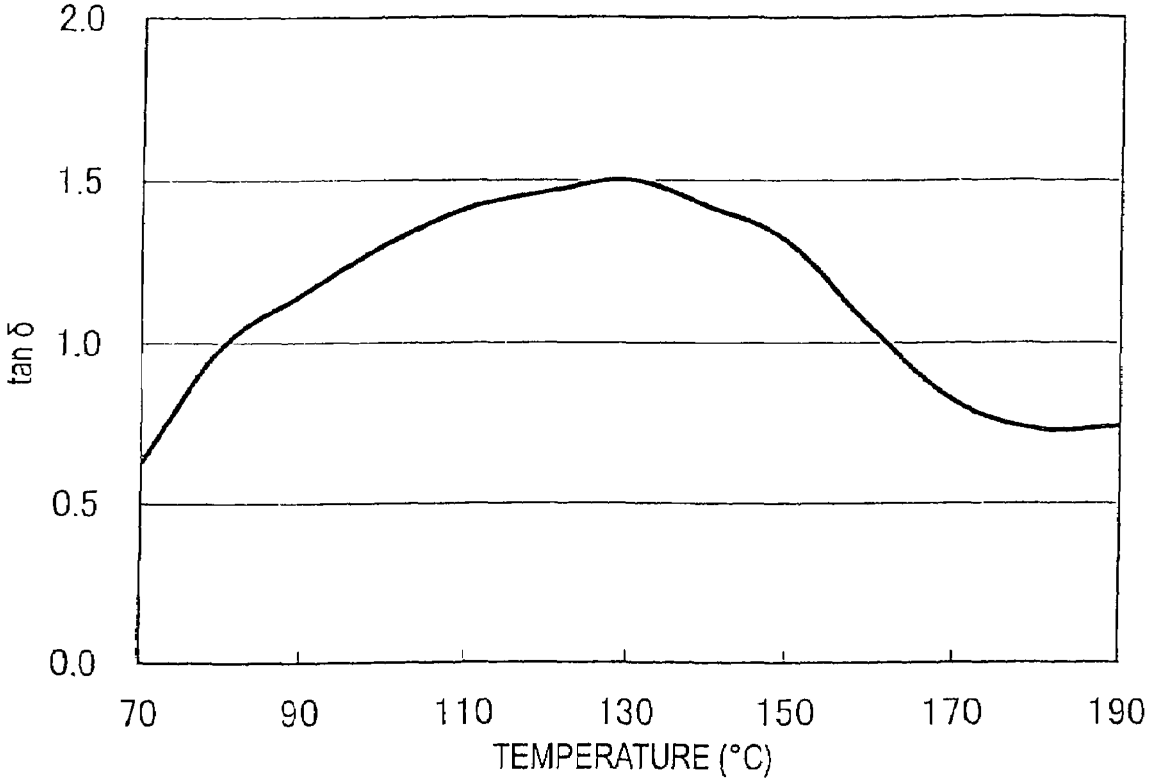
FIG. 9 is an explanatory view showing changes in tan δ according to the temperature.

FIG. 8 is an explanatory view showing a correspondence between the temperatures at which tan δ measured as above is maximized and the fixing temperature ranges. FIG. 9 shows changes in tan δ for the sample 5 while the temperature is being changed. As shown in FIG. 9, tan δ0 is changed to form a circular arc as the temperature is raised. In FIG. 8, the temperature at which tan δ is maximized is set to be a horizontal axis and the fixing temperature range of the sample is set to be a vertical axis.

As shown in FIG. 8, all the toners of which tan δ is maximized at the temperature of 125° C. or more (e.g., samples 1, 2, 4, 6, 7, 8, 9, 10, 11 and 12 shown in Table 1) have the fixing temperature ranges of 60° C. and more. Also, as shown in Table 1, the sample 13 has the fixing temperature range of 60° C. and more although the temperature at which tan δ is maximized is 110° C. This is because Mw/Mn of the sample 13 is 30 or more. As shown in Table 1, Mw/Mn of the samples 0, 1, 2, 4, 6 and 13 is 30 or more. Accordingly, the samples 6, 8, 9, 10, 11, 12 and 13 are excellent in both low temperature fixability and offset resistance. Specifically, the samples 6, 8, 9, 10, 11 and 13 are more excellent in low temperature fixability since the minimum fixing temperatures of the toner is below 130° C. The resin in the sample 0 of which tan δ is maximized in a range below 100° C. was very hard. Also, the minimum fixing temperature of the sample 0 was high, i.e., 160° C. although the fixing temperature range was 70° C.

As above, the present embodiment prevents appearance of an offset and achieves low power consumption in the image forming apparatus by evaluating low temperature fixability and offset resistance of toner.

The present invention is not limited to the above described embodiments. The present invention can be practiced in various manners without departing from the scope of the invention. For instance, the present invention can be applied not only to a printer, but also to various image forming apparatus such as a copy machine and a facsimile machine.

What is claimed is:

1. A toner evaluation method that evaluates fixation performance of toner, comprising:

a pellet forming step in which a sample of a toner to be evaluated is formed into a pellet, a preserving step in which the toner pellet is preserved at a preserving temperature;

a compression step in which the toner pellet is compressed by a predetermined amount at a constant speed while maintaining the preserving temperature of the toner pellet, and a maximum load is measured during compression of the toner, and an evaluation step in which a fixation performance of the toner is evaluated by determining whether the maximum load applied to the toner pellet is not more than a predetermined value.

2. The toner evaluation method according to claim 1, further comprising:

a sampling step in which the toner is sampled, and the pellet preserved at the preserving temperature is compressed by the predetermined amount at the constant speed and the maximum load is measured during compression of the pellet in the compression step.

3. The toner evaluation method according to claim 1, wherein the toner is preheated for five minutes or more at the preserving temperature in the preserving step.

4. The toner evaluation method according to claim 1, wherein the toner positively evaluated in the evaluation step is selected to fill a toner cartridge, while the toner negatively evaluated in the evaluation step is not selected to fill the toner cartridge.

5. The toner evaluation method according to claim 1, wherein 0.10 grams (g) of the toner is used to form the pellet, the toner is formed into a disc-shaped pellet having a diameter of 7 millimeters (mm) and a thickness of 2 mm in the pellet forming step, the disc-shaped pellet is preserved at a preserving temperature of 80° C. in the preserving step, the disc-shaped pellet is compressed by 1 mm at a speed of 5 mm/sec in the compression stop, and the maximum load measured in the compression step is equal to 8,000 g or below in the evaluation step.

6. The toner evaluation method according to claim 1, wherein 0.10 grams (g) of the toner is used to form the pellet, the toner is formed into a disc-shaped pellet having a diameter of 7 millimeters (mm) and a thickness of 2 mm in the pellet forming step, the disc-shaped pellet is preserved at a preserving temperature of 70° C. in the preserving step, the disc-shaped pellet is compressed by 1 mm at a speed of 5 mm/sec in the compression step, and the maximum load measured in the compression step is equal to 17,000 g or below in the evaluation step.

7. The toner evaluation method according to claim 1, further comprising:

a preparation step in which the toner is sampled, and a viscoelasticity measurement step in which viscoelasticity of the toner is measured using the toner sampled in the preparation step while a temperature of the toner is being changed so as to obtain a loss tangent tan δ which is a ratio between a storage modulus G' and a loss modulus G", wherein, in the evaluation step, the fixation performance of the toner is further evaluated by determining whether a maximum value of the loss tangent tan δ falls within a predetermined temperature range and whether the maximum load measured in the compression step is equal to or smaller than the predetermined value.

8. The toner evaluation method according to claim 7, wherein, in the evaluation step, the fixation performance of the toner is further evaluated by determining whether a maximum value of the loss tangent tan δ falls within a temperature range from 100° C. to below 125° C. and whether the maximum load measured in the compression step is equal to or smaller than the predetermined value.

9. The toner evaluation method according to claim 1, further comprising:

a preparation step in which the toner is sampled, and a molecular weight measurement step in which a weight-average molecular weight Mw and a number-average molecular weight Mn of the toner sampled in the preparation step are measured by gel-permeation chromatography, wherein, in the evaluation step, the fixation performance of the toner is further evaluated by determining whether a ratio Mw/Mn of the measured weight-average molecular weight Mw to the number-average molecular weight Mn is a predetermined ratio value or more and whether the maximum load measured in the compression step is equal to or smaller than the predetermined value.

10. The toner evaluation method according to claim 9, wherein, in the evaluation step, the fixation performance of the toner is further evaluated by determining whether the ratio Mw/Mn of the measured weight-average molecular weight Mw to the number-average molecular weight Mn is 30 or more and whether the maximum load measured in the compression step is equal to or smaller than the predetermined value.

11. The toner evaluation method according to claim 1, wherein the toner contains a crystalline polyester and an amorphous polyester.

12. A toner cartridge that is filled using a toner that has been positively evaluated by the toner evaluation method according to claim 1.

13. An image forming apparatus comprising a toner cartridge according to claim 12, and an image forming unit that forms an image by electrophotography using the toner in the toner cartridge.

* * * * *